United States Patent [19]

Ellmers et al.

[11] Patent Number: 4,915,327
[45] Date of Patent: Apr. 10, 1990

[54] SLAT ACTUATION AND STEERING

[75] Inventors: Wilfried Ellmers, Achim; Wilhelm Martens, Delmenhorst, both of Fed. Rep. of Germany

[73] Assignee: MBB GMBH, Bremen, Fed. Rep. of Germany

[21] Appl. No.: 213,335

[22] Filed: Jun. 30, 1988

[30] Foreign Application Priority Data

Jun. 30, 1987 [DE] Fed. Rep. of Germany ....... 3721479

[51] Int. Cl.$^4$ .............................................. B64C 9/24
[52] U.S. Cl. ..................................... 244/210; 244/214
[58] Field of Search ................ 244/210, 211, 213, 214

[56] References Cited

U.S. PATENT DOCUMENTS

| 3,272,458 | 9/1966 | Bracka | 244/210 |
| 4,202,519 | 5/1980 | Fletcher | 244/210 |
| 4,399,970 | 8/1983 | Evans | 244/214 |
| 4,437,631 | 3/1984 | Martens et al. | 244/210 |
| 4,650,140 | 3/1987 | Cole | 244/214 |

FOREIGN PATENT DOCUMENTS 2101536  9/1972  Fed. Rep. of Germany ...... 244/214

Primary Examiner—Joseph F. Peters, Jr.
Assistant Examiner—Rodney Corl
Attorney, Agent, or Firm—Ralf H. Siegemund

[57] ABSTRACT

An actuation device for a slat, a rail for guiding and moving the slat into and out of an aircraft wing has the slat pivoted on the rail in a particular point (8); a thrust rod has one end hinged to the slat and a drive crank is connected to a second end of the thrust rod; a lever assembly connects the rail additionally to the slat at points on the rail and the slat different from the particular point and for pivoting and steering the slat relative to the particular point, for holding the rear end of the slat against the wing in a first protraction range and opening a gap upon further protraction.

6 Claims, 2 Drawing Sheets

SLAT ACTUATION AND STEERING

BACKGROUND OF THE INVENTION

The present invention relates to the actuation of a slat in an aircraft wing running on rails arranged in the front portion of wing of an aircraft. Devices to which the invention pertains include structure wherein a slat is for instance held by means of thrust rods which are linked to and operated by cranks by means of which the slat can be extended and retracted. Usually there are multiple slats driven by a central drive facility, a common transmission path and drive facilities either in a centralized or a decentralized fashion so as to actuate the various slats along the leading edge of the wing.

Slats are used in wings of aircraft in order to improve the lift-to-drag relationship, particularly during critical phases of flight. These slats are usually extended or retracted by means of spindle drives cooperating with levers, cranks and so forth. Stationary rollers run on a curved track which is fastened to the slat. The slat and the actuation including crank drives, thrust rods, rails, etc. permit movement of the slat along a circular track but will lift off the rigid nose of the wing, as the slat moves in upstream or forward direction. A gap continuously opens between the slat and the wing nose proper until a maximum extension is obtained, wherein that gap has also maximum value.

U.S. Pat. No. 4,437,631, corresponding to German Pat. No. 2,916,040, includes a wing with movable slats which is driven through thrust rods and crank drives; different arrangements are driven through a common drive shaft, and the particulars of that adjustment includes a crank arm connected to be driven by a gear and a rod is linked with one end directly to the crank, the other end is pivotally linked to the slat, and there is a cover on the thrust rod extending for the length and completing the wing surface when the slat is held in a retracted position. An arc-shaped guard rail is connected to the slat and a guide structure is in running engagement with the rail and is connected to the wing to obtain the drive along a pre-described path.

A very important aspect of that patent is to make sure that there is aerodynamic continuity. It was found, however, that a certain problem arises for a slat drive of the type of that patent in that for take-off and landing, as well as climbing, the dispositions of the slat are basically quite similar, which means that right from the beginning of the extension, the slat lifts off the nose of the wing. Landing and take-off, however, require different aerodynamic considerations. For example, for takeoff and climbing, there is supposed to be an optimum relationship between lift and drag, i.e. the lift is supposed to be high, and the drag is supposed to be low. During landing, the situation is actually the reverse.

DESCRIPTION OF THE INVENTION

It is an object of the present invention to provide a new and improved actuation for a slat in an aircraft wing such that on forward protraction, the trailing edge of the slat runs close to the upper side of the fixed wing nose during take-off and climbing, while upon landing, a further extension of the slat changes the angle and spacing of the slat towards a maximum value, and the trailing edge of the slat lifts off the landing edge of the wing proper.

In accordance with the preferred embodiment of the invention, it is suggested to provide the control of the movement of a slat by means of a thrust rod having its front ends linked to the slat, while the rear end of the thrust rod is driven by a crank. Additional lever linkage and structure is provided to steer the slat and pivot it such that in a first range of slat protraction, the rear end of the slat is held against the wing, while on further protraction a gap opens up between slat and wing. The first range is used on take-off and climbing, the further protraction on descent and landing. The steering amounts to pivoting of the slat vis-a-vis the track which extends with the slat and defines a curved path of slat protraction. The steering provided as per the invention is superimposed upon the curvilinear protraction/retraction by the track.

DESCRIPTION OF THE DRAWINGS

While the specification concludes with claims particularly and distinctly claiming the subject matter which is regarded as the invention, it is believed that the invention, the objects and features of the invention and further objects, features and advantages thereof will be better understood from the following description taken in connection with the accompanying drawings. The two figures show two different versions of steering the slat on a track portion.

Figure 1:
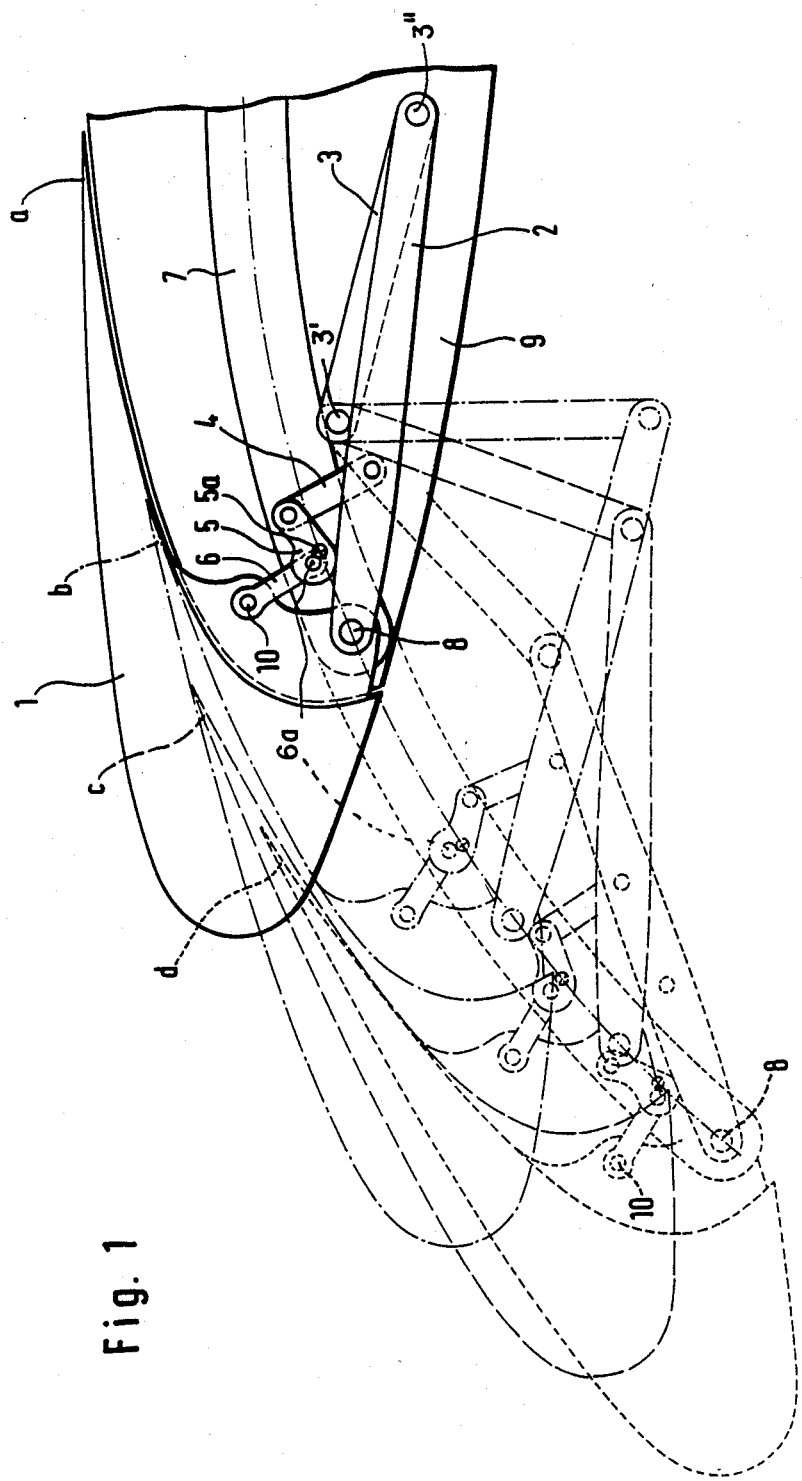
FIG. 1 illustrates the leading edge portion of an aircraft wing showing specifically a slat in various positions of extension and protraction being indicated by clashed, dash-dot and dotted lines.

Proceeding now to the detailed description of the drawings, the actuating mechanism for moving the slat is situated inside the wing 9, upon attaining and maintaining a retracted state. A slat-drive arrangement in this particular embodiment includes a gear (not shown but) acting on the shaft 3' of a crank 3 and being driven from a central drive through a common transmission shaft. This gear controls retraction and protraction of the slat. For this, crank 3 is connected in a manner known per se and in a positive fashion with the drive so that there is no slack. The free end 3'' of crank 3 is linked to the rear end a thrust rod 2 having its front end linked and articulated to a point 8 of the slat 1.

Turning now to details of the inventive slat actuation, it is significant that the thrust rod 2 is provided with an intermediate linkage lever 4, at some location in its front or forward half; the lever 4 in turn is pivotally connected to the long arm of an L-lever 5. Another linkage arm 6 is hinged to a point 10 on slat 1 and thus provides for linkage to the slat 1. That point 10 is situated above the aforementioned connect point 8 between the slat and thrust rod 2. Arm 6 has its other end hinged to the short end of L-shaped lever 5, hinge point 6a. That hinge point can turn around a pivot 5a by means of which the corner of L-lever 5 is pivotally connected to track 7. In order to participate in the movement of the slat and supporting the rear portion of the slat 1, lever 5 through linkage arm 6 pivots slat (point 10) around point 8 on the guide rail 7. The slat is thus moved through the combined steering movement and lever operation of thrust rod 2 and parts 4, 5 and 6.

It can thus be seen that as slat 1 is moved by this combined linkage and steering control and actuating mechanism, from the fully drawn (retracted) position to the dash-dot position (b) no gap opens up between slat 1 and wing 9. Thus the slat 1 does not offer any gap vis-a-vis the leading edge of the wing during this particular first range of extension. In a second range of extension through the dash dot and the dotted positions (c and d) such a gap opens up to an increasing extent. This linkage 4,5,6 thus makes sure that the slat 1 has its rear end held against wing 9 in the protraction range a–b which is used on take-off and climbing. On further movement of the slat through the crank 3a, a gap opens up (range b–c).

FIG. 1 shows specifically that the slat 1 when fully retracted, abuts tightly to the rigid nose of wing 9. The inventive actuating equipment is indeed situated inside the wing 9. For take-off and climbing, slat 1 is protracted into the first protracted position b where arm 6 is in line with the long arm of 5. The actuating mechanism makes sure that the slat 1 remains in abutment along the upper side of the wing nose without forming a gap between it and slat 1.

Further protracted positions such as c and d are attainable through adjustment of the craft towards the landing operation. Here then the position of slat 1 is completely protracted and the rear or trailing edge of the slat 1 has lifted off the nose of wing 9. A large as possible angle attains between the slat 1 and the wing 9 which is a steep angle vis-a-vis the oncoming flow and introduces significant drag as is defined during descent and landing.

Figure 2:
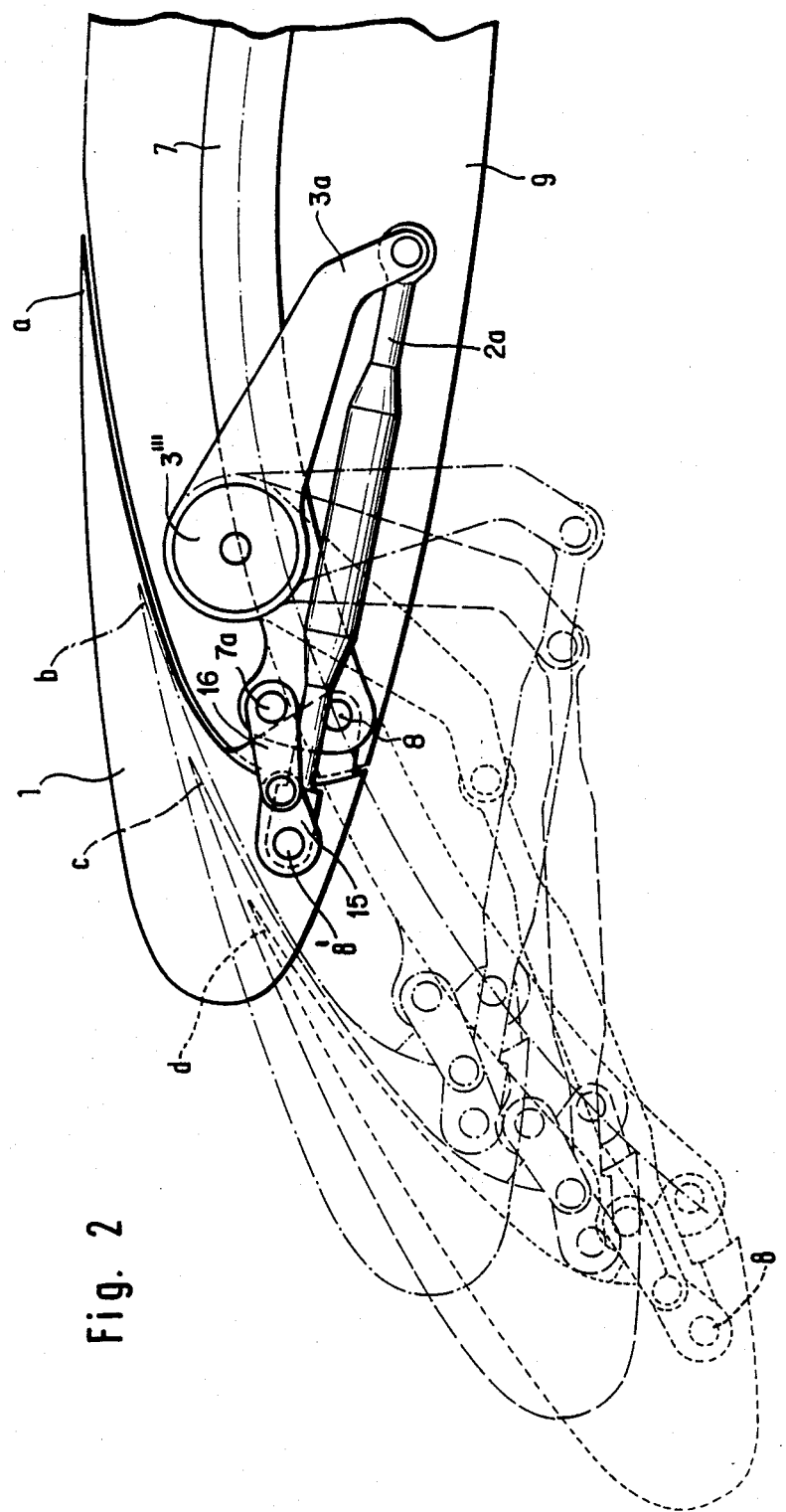
FIG. 2 illustrates a slat similar to the one shown in FIG. 1 but with a drive in which drive and actuation are separated from each other.

The particular modification shown in FIG. 2 is related to the slat drive particulars wherein the drive is connected with the slat in a certain spacing from the adjustment mechanism. The crank 3a provides merely for the protraction and retraction of the slat 1 via rod 2. A separate mechanism links the guide-rails 7 and slat 1 for steering and is comprised of the levers 15 and 16. Lever 15 is linked at 8' to the slat (rather than 8) and lever 16 connects lever 15 to a point 7a on the track 7.

The assembly just described changes and controls the geometry of the protraction and retraction of the slat, here now under utilization of levers 15 and 16, point 7a is the pivotal hinge connection in the example between slat 1 and track 7 being also off the connect point 8' between rod 2 and slat 1. The levers 15,16 articulate that slat connect point 8' additionally to the track 7 at hinge point 7a, so that again the rear end of slat 1 is held against wing 9 throughout the range of positions a,b while through actuation of the levers the pivot motion of the slat on 8 opens the gap in a controlled fashion.

The slats are usually divided into sections or segments, and it is advisable to provide spanwise a separate mechanism for each of the segments.

The invention is not limited to the embodiments described above, but all changes and modifications thereof, not constituting departures from the spirit and scope of the invention, are intended to be included.

We claim:

1. Actuation device for a slat being held on rail means for guiding and moving the slat into and out of an aircraft wing comprising:

the slat being pivoted on the rail means in a particular point (8);

a thrust rod having a first end hinged to the slat at a first hinge point;

a crank on the wing and connected to a second end of the thrust rod, there being drive means for the crank; and lever means connecting the rail means additionally to the slat at another point on the rail means different from the particular point and for pivoting and steering the slat relative to the particular point, for holding the rear end of the slat against the wing in a first protraction range and opening a gap upon further protraction.

2. Device as in claim 1, the lever means having a first lever hinged to said first point and to another lever which in turn is hinged to the rail means in a point being different from the particular point of connection of the rail means to the slat, to thus obtain steering of the slat.

3. Device as in claim 1, said lever means including a lever connection between the thrust rod and a point between the two end points of the thrust rod and further providing another hinge point (5a) on the rail means different from the connection of the rail means to the slat at the particular point and including a separate connection to the slat different from that particular point, to obtain the steering of the slat.

4. Actuation device for a slat being held on rail means for guiding and moving the slat into and out of an aircraft wing comprising:

a thrust rod having a first end hinged to the slat at a first hinge point;

a crank on the wing and connected to a second end of the thrust rod, there being drive means for the crank;

first lever means hinged to the thrust rod in an intermediate point between the ends;

second lever means (i) hinged to the slat at a second hinge point, (ii) having a pivoting steering connection to the rail means, and (iii) being pivotally connected to the first lever means; and the first hinge point being below the second hinge point.

5. Device as in claim 4, the second lever means including an L-shaped lever hinged to the first lever means and being pivotally connected to the rail means, the second lever means further including a linking arm, hinged to the slat at said second hinge point and being hinged to the short end of the L-shaped lever.

6. Actuation device for a slat being held on rail means for guiding and moving the slat into and out of an aircraft wing comprising:

a thrust rod having a first end hinged to the slat at a first hinge point;

a crank on the wing and connected to a second end of the thrust rod, there being drive means for the crank;

the slat being pivoted on the rail means in a particular point different from said first hinge point;

lever means articulated and hingedly connecting the first hinge point of the slat to a steering point on the rail means different from the particular point of pivot connection of the rail means to the slat.

* * * * *